(No Model.) 2 Sheets—Sheet 1.

G. F. GODLEY.
HEATER

No. 348,555. Patented Sept. 7, 1886.

WITNESSES:

INVENTOR,
George F. Godley
By S. J. Van Stavoren
ATTORNEY (No Model.) 2 Sheets—Sheet 2.

G. F. GODLEY.
HEATER

No. 348,555. Patented Sept. 7, 1886.

WITNESSES:

INVENTOR
George F. Godley
By S. J. Van Stavoren
ATTORNEY

UNITED STATES PATENT OFFICE.

GEORGE F. GODLEY, OF PHILADELPHIA, PENNSYLVANIA.

HEATER.

SPECIFICATION forming part of Letters Patent No. 348,555, dated September 7, 1886.

Application filed February 10, 1886. Serial No. 191,416. (No model.)

*To all whom it may concern:*

Be it known that I, GEORGE F. GODLEY, a citizen of the United States, residing at Philadelphia, in the county of Philadelphia and State of Pennsylvania, have invented certain new and useful Improvements in Heaters, of which the following is a specification, reference being had therein to the accompanying drawings, wherein—

Figure 1:
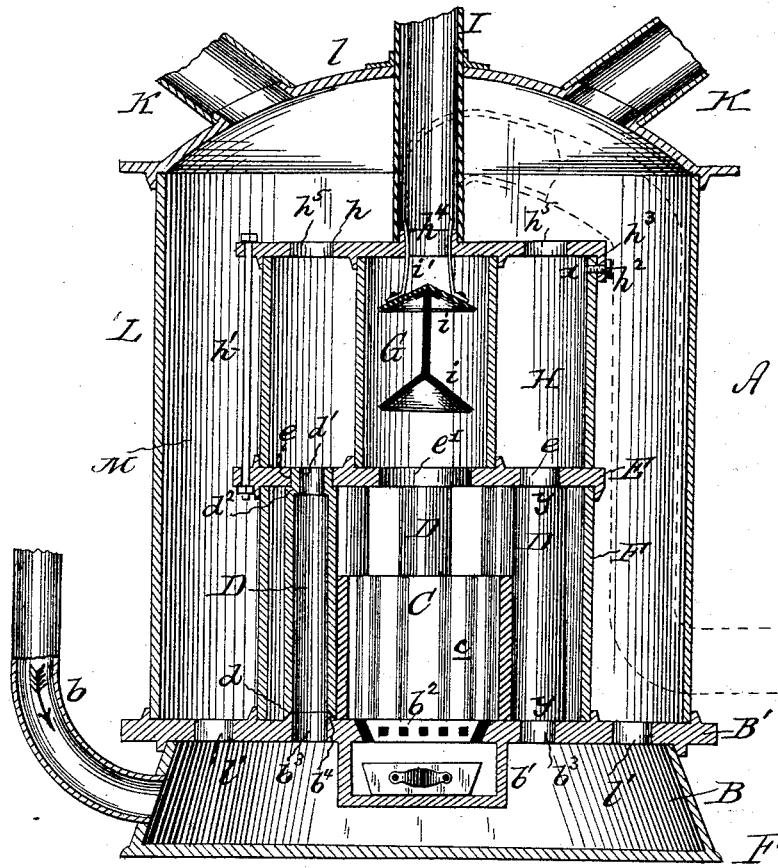
Figure 2:
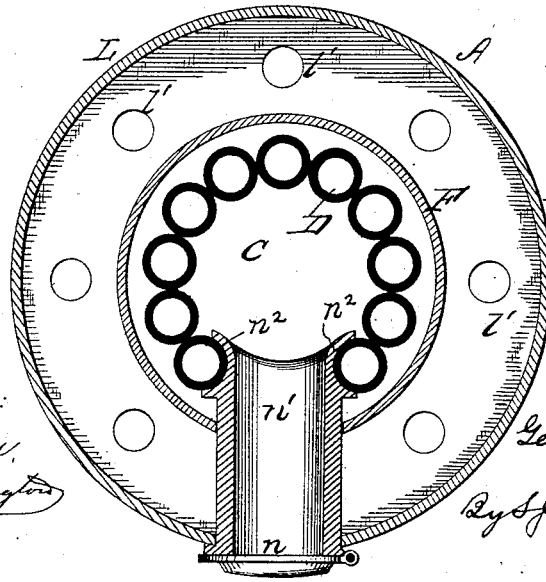
Figure 3:
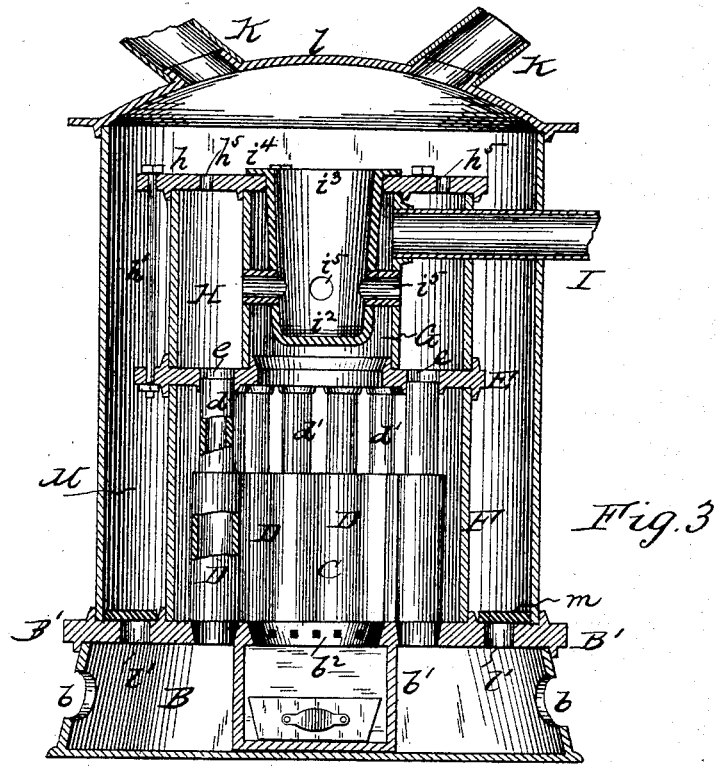
Figure 4:
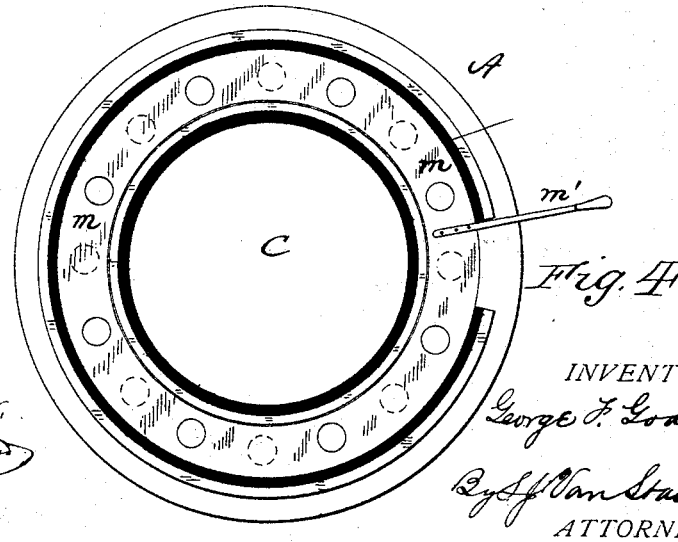

Figure 1 is a longitudinal section of a heater embodying my improvements, showing firebrick, fire-pot, and surrounding hot-air tubes separated from one another, and also deflectors in the smoke-pipe passing through the hot-air drum. Fig. 2 is a horizontal section through the fire-pot, showing it composed of hot-air pipes placed close together. Fig. 3 is a vertical section of heater with fire-pot composed of hot-air tubes placed close together and contracted, or of a lesser bore at their upper parts, and showing a single inverted deflector in the smoke-pipe of the hot-air drum; also an annular damper for regulating the volume of cold air passing into the hot-air chamber or drum between the fire-box and outside jacket or wall of the furnace; and Fig. 4 is a horizontal section of furnace, showing plan of the annular damper.

My invention has relation to heaters or heating-furnaces for buildings and other fixtures to be heated; and it has for its object to provide a simple, compact, and durable heater which is economical in the consumption of fuel required for heating the largest volume of cold air possible with a given amount of fuel.

My invention accordingly consists of the combination, construction, and arrangement of parts comprising a heater, as hereinafter described and claimed.

In the drawings, A represents the heater, composed of the usual hollow bottom or base or other suitably-constructed cold-air chamber, B, having inlet pipe or pipes $b$, and a removable top plate, B', provided with ash-box $b'$ and grate $b^2$ below the fire-box C, which is preferably a cylindrical form. Surrounding the latter is an annularly-arranged series of hot-air tubes or pipes, D, which are preferably loosely secured in position between the plate B' and an upper plate, E, in the following-described manner: Upon the upper side of plate B', and surrounding the upper edge of each opening $b^3$ therein, is a flange, $b^4$, which is chamfered off or tapered on its outside from above downward to fit into a corresponding tapered or chamfered lower end, $d$, of the pipe D, placed thereon, and the upper end of each of the latter is formed with a contracted or reduced upper end, $d'$, which enter openings $e$ in plate E, which rests upon the shoulders $d'$ of pipes D, formed by contracting their upper ends, as described. Outside of pipes D is a jacket, F, to prevent the gases or products of combustion escaping from the fire-box into the hot-air flues. In the center of the plate E is a large opening, $e'$, for escape of the products of combustion into a smoke-drum, G, surrounding said opening $e'$, which drum G is incased in a hot-air drum, H, having a top plate, $h$, secured to drum H, and to plate E by screw-rods $h'$, as shown in Fig. 1; or, if desired, the plate $h$ may be secured to the drum H by side screws, $h^2$, passing through the flange $h^3$, depending from the underside of said plate, as shown at $x$, Fig. 1.

The drum H has a central opening, $h^4$, which leads into the smoke stack or pipe I, which is considerably smaller in diameter than the smoke-drum G, to partly retard the too free escape of the products of combustion from smoke-drum G, in order that the heat of such products as they pass through and are retained or retarded in said drum may be in a measure utilized for heating the air in drum H. To still further utilize the heat of the products of combustion as they pass through drum G, one or more deflectors, $i$, having suitable spring or other supports, $i'$, are placed or secured in drum G for repeatedly directing the products of combustion to the sides of said drum. In the top of the plate $h$, and outside of smoke-drum G, are a series of openings, $h^5$, for the escape of hot-air from drum H to the hot-air delivery-pipes K, inserted into or connected to the top $l$ of the jacket L, which incloses the fire-box and hot-air drum, and forms a second hot-air drum or chamber, M, outside of the fire-box and drum H. The cold-air for chamber or drum M is supplied thereto from chamber B by way of an annular series of openings, $l'$, formed in plate B', outside of or surrounding the pipe-openings $b^3$. The smoke stack or pipe I may pass out of the top $l$ of the jacket L, as shown in full lines of Fig. 1, or it may be deflected and passed down through chamber M, formed by said jacket, and led out at the side thereof near its bottom, as indicated in dotted lines in said figure.

When the hot-air tubes are separated from one another, as illustrated in Fig. 1, a fire-brick or other suitable fire-box, c, is used, as indicated in said figure, and when placed together, as shown in Fig. 2, no separate fire-pot is employed, as the pipes D themselves form the fire-pot, in which case, however, I prefer to reduce their diameter for a portion of their length at their upper parts, as shown at $d'$ in Fig. 3, such reduced part extending down to what would ordinarily be the top of the fire-pot if of brick or metal, so that the upper parts of the pipes D are separated from one another to admit of the flames and products of combustion encircling or passing around their upper parts to more thoroughly heat them than would otherwise be the case if closed together.

In Fig. 3 the smoke-pipe I is led out laterally from the smoke-drum G, in which is a single depending deflector, $i$, of tubular or cylindrical shape, having a closed bottom, $i^2$, and an open top, $i^3$, provided with an edge flange, $i^4$, for closing the top of smoke-drum G, and having side pipe-connections, $i^5$, with hot-air drum H.

To regulate the volume of cold air admitted to chamber M, an annular damper or register, $m$, (see more plainly Figs. 3 and 4, is placed upon the upper side of plate B', at the bottom of said chamber, and has a lateral handle, $m'$, for adjusting the damper or register, as desired.

As the pipes D practically form the fire-box of the heater, they are always more or less hot to heat the air in them and cause it to ascend to drum H, wherein such air is still further heated by the smoke-drum G, and, as the flames and products of combustion heat the jacket F, the air in the lower part of chamber M is also heated, and as it ascends around drum H it is still further heated, to provide an additional volume of hot air for the delivery-pipes.

Should any of the pipes D at any time show wear on their sides next to the fire-box, they, being loosely supported in position, can readily be partly turned around to present fresh or new sides to the fire-box. These pipes may be made of iron, steel, or other suitable metal. For some forms of heaters I prefer to make the pipes of steel and for others to make them of iron or copper.

When my improvements are applied to brick heaters, the metal jacket L is dispensed with. The brick wall then takes the place of said jacket L. When the pipes D are used as a fire-box, its coal or fuel door $n$, with its chute $n'$, is preferably made with side concave or other suitably configured flanges, $n^2$, to loosely fit upon and connect or lock said frame with the adjacent pipes D, thereby dispensing with riveting or otherwise specially fastening the fire-box chute in place.

Instead of contracting the pipes D at their upper ends, they may be of one diameter from end to end, and in this case the openings $e$ in plate E are of a smaller diameter than the bore of said pipes, as shown at $y$, Fig. 1, so as to more or less retard the ascent of air in said pipes equally as well as the latter do when their upper ends are contracted.

In heaters which are bricked in and in those which stand on legs the air-chamber B can be dispensed with, as the open space between the bottom of plate B' and the floor or surface upon which the bricks or legs rest then forms the air-chamber, which is then an open instead of a closed chamber.

From the foregoing it will be noted that the tubes D do not extend up to near the top of the heater, as has been the case in some constructions of heaters having hot-air tubes surrounding or forming the fire-box; that said tubes are surrounded by a jacket and communicate with a hot-air drum having an inner or central smoke-pipe for the escape of the products of combustion; and, finally, that the jacket for the hot-air tubes D and for the drum H are inclosed within another case or jacket to form a second or outside hot-air chamber. This construction not only admits of the greatest possible utilization of the caloric generated in the fire-box, and that passing off with the products of combustion for quickly heating a large volume of air, but also affords provision for the expansion and contraction of the pipes D without admitting gas or the products of combustion to the hot-air drums.

What I claim is—

1. The combination, with a heater or furnace, of a drum, H, having inner or central smoke-flue and bottom plate, E, and a fire-box composed of an annularly-arranged series of pipes loosely held in place by said bottom plate, and having their upper halves or portions reduced in diameter, as and for the purpose set forth.

2. The combination, with a heater, of an ash-box, cold-air flues, a fire box or cylinder, C, drum H, and a series of pipes surrounding said cylinder, communicating with said drum and cold-air flues, and a separate or independent hot-air flue or chamber surrounding said fire-box pipes and drum, substantially as and for the purpose set forth.

3. The combination, with a heating-furnace of a fire box or cylinder, C; of a series of pipes surrounding the fire-box and exposed to its flames, and having contracted upper ends, a hot-air drum having inner or central smoke-pipe, and a separate hot-air flue or chamber surrounding said fire-box pipes and drum, substantially as shown and described.

4. The combination, with a heater, of a cold-air box, a fire-box composed of a series of tubes communicating with the cold-air box and contacting with each other for a portion of their length, and separated from each other for the remaining portion of their length, a hot-air drum located above said tubes and communicating between said pipes and drum, a smoke-pipe passing through said drum, and a separate hot-air flue or chamber surrounding said fire-box pipes and drum, substantially as shown and described.

5. The combination, with a heater, of a cold-air chamber, a fire-box, a hot-air drum, a smoke-drum inclosed in the hot-air drum, a series of pipes surrounding the fire-box and exposed to its heat and flames and communicating with the cold-air chamber and hot-air drum, a jacket, F, surrounding said tubes, and a hot-air chamber outside of or surrounding said jacket and drum, as and for the purpose set forth.

6. The combination, with a heater, of cold-air chamber B, having top plate, B', provided with openings $b^3$, drum H, having inner or central smoke-pipe and bottom plate, E, pipes D, loosely held in position between plates B' and E, and jacket F, surrounding said pipes, substantially as shown and described.

7. The combination, with a heater, of cold-air chamber B, fire-box C, pipes D, surrounding said fire-box, jacket F, outside hot-air chamber, M, having communicating channels or openings $l'$ with chamber B, and an annular damper or register, $m$, for said openings, as and for the purpose set forth.

8. The combination, with a heating-furnace, of a cold-air box or supply, a fire-box composed of a series of tubes communicating with the cold-air supply or box and serving as hot-air pipes, a smoke-pipe for the fire-box, and a hot-air chamber outside of or surrounding the fire-box pipes, substantially as and for the purpose set forth.

9. A heater or furnace having a fire-box composed of top and bottom plates and a series of pipes or tubes loosely held in position so as to be removable by said top and bottom plates, a contracted opening in said top plate, a smoke-flue for said opening, and a jacket, F, surrounding the fire-box tubes, as and for the purpose set forth.

10. The combination, with a heater, of a fire-box, C, pipes D, surrounding the fire-box, a drum, H, located above and communicating with pipes D, and having a smoke-drum, G, terminating in a smoke or outlet pipe, I, a jacket, F, surrounding pipes D, and a jacket or casing surrounding jacket F and drum H, and having outlet-pipes K, substantially as set forth.

11. A heater or furnace having a fire-box composed of a series of tubes or pipes, forming hot-air flues, and a second hot-air chamber separate from and surrounding said flues, as and for the purpose set forth.

12. A heater having pipes D surrounding the fire-box, and a fuel chute or box for the latter, having side flanges to lock or connect with said pipes and hold the chute in position, substantially as set forth.

In testimony whereof I affix my signature in presence of two witnesses.

GEORGE F. GODLEY.

Witnesses:
S. J. VAN STAVOREN,
CHAS. F. VAN HORN.